(12) United States Patent
Kim et al.

(10) Patent No.: US 10,378,628 B2
(45) Date of Patent: Aug. 13, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jong Soo Kim, Seoul (KR); Dong Hwan Hwang, Seoul (KR); Jong Sool Park, Hwaseong-si (KR); Kyeong Hun Lee, Seoul (KR); Jin Ho Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/013,647

(22) Filed: Jun. 20, 2018

(65) Prior Publication Data
US 2019/0063572 A1     Feb. 28, 2019

(30) Foreign Application Priority Data
Aug. 30, 2017  (KR) .......................... 10-2017-0110176

(51) Int. Cl.
*F16H 3/66*  (2006.01)
*F16H 37/04*  (2006.01)

(52) U.S. Cl.
CPC .............. *F16H 37/04* (2013.01); *F16H 3/66* (2013.01); *F16H 2037/047* (2013.01); *F16H 2200/0065* (2013.01); *F16H 2200/2012* (2013.01); *F16H 2200/2046* (2013.01)

(58) Field of Classification Search
CPC ...... F16H 3/66; F16H 37/04; F16H 2037/047; F16H 2200/0065; F16H 2200/2012; F16H 2200/2046
USPC ........................................................ 475/275
See application file for complete search history.

(56) References Cited

U.S. PATENT DOCUMENTS

| | | | | |
|---|---|---|---|---|
| 9,217,494 B2* | 12/2015 | Hoffman | .................... | F16H 3/66 |
| 9,777,804 B2* | 10/2017 | Lee | .................... | F16H 3/66 |
| 9,897,176 B2* | 2/2018 | Lee | .................... | F16H 3/666 |
| 9,951,848 B2* | 4/2018 | Lee | .................... | F16H 3/663 |
| 10,047,835 B2* | 8/2018 | Kim | .................... | F16H 3/66 |
| 10,184,552 B2* | 1/2019 | Lee | .................... | F16H 37/04 |
| 2017/0241519 A1* | 8/2017 | Kim | .................... | F16H 3/666 |

(Continued)

*Primary Examiner* — Leslie A Nicholson, III
(74) *Attorney, Agent, or Firm* — Morgan, Lewis & Bockius LLP

(57) ABSTRACT

A planetary gear train may include first to fourth planetary gear sets having first to third, fourth to sixth, seventh to ninth, and eighth to twelfth elements, the first to third gear sets being mounted on an input shaft, the fourth gear set being mounted on an output shaft, first shaft connected to the first and fourth elements, second shaft connected to the second and ninth elements, third shaft connected to the third element and the input shaft, fourth, fifth, sixth, and seventh shaft connected to the fifth, sixth, seventh, and eighth elements respectively, eighth shaft connected to the tenth element and externally gear-meshed with the fifth shaft, ninth shaft connected to the eleventh element and the output shaft, tenth shaft connected to the twelfth element, and externally gear-meshed with the seventh shaft, and two transfer gears each forming external gear-engagement between a corresponding pair of shafts.

21 Claims, 6 Drawing Sheets

(56) References Cited

U.S. PATENT DOCUMENTS

2018/0100568 A1\* 4/2018 Kim .......................... F16H 3/66
2018/0163824 A1\* 6/2018 Kim ......................... F16H 3/666
2018/0163831 A1\* 6/2018 Kim ......................... F16H 37/04
2018/0363733 A1\* 12/2018 Lee .......................... F16H 3/666

\* cited by examiner

FIG. 2

| Shift-stage | Clutch | | | | Brake | | Gear ratio | Step ratio | Remark |
|---|---|---|---|---|---|---|---|---|---|
| | C1 | C2 | C3 | C4 | B1 | B2 | | | |
| D1 | | ● | | ● | | ● | 5.03 | | Gear ratio span : 9.28 Gear ratio of R/D1 : -0.65 |
| D2 | | | ● | ● | | ● | 3.18 | 1.58 | |
| D3 | ● | | ● | | ● | ● | 2.17 | 1.47 | |
| D4 | ● | | ● | | | ● | 1.66 | 1.31 | |
| D5 | ● | ● | ● | | ● | | 1.28 | 1.29 | |
| D6 | ● | ● | | | ● | | 1.03 | 1.24 | |
| D7 | ● | ● | ● | | | | 0.79 | 1.30 | |
| D8 | ● | | ● | ● | | | 0.67 | 1.18 | |
| D9 | ● | | | ● | | | 0.54 | 1.24 | |
| REV | ● | | | ● | | ● | -3.26 | - | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0110176 filed on Aug. 30, 2017, the entire contents of which is incorporated herein for all purposes by this reference.

BACKGROUND OF THE INVENTION

Field of the Invention

The present invention relates to an automatic transmission for a vehicle.

Description of Related Art

Recently, increase of oil price is triggering a hard competition in enhancing fuel consumption of a vehicle.

In this sense, research on an automatic transmission has been performed to simultaneously provide better drivability and fuel consumption by achieving more shift stages.

To achieve more shift stages for an automatic transmission, the number of parts is typically increased, which may deteriorate installability, production cost, weight and/or power flow efficiency.

Therefore, to maximally enhance fuel consumption of an automatic transmission having more shift stages, it is important for better efficiency to be derived by fewer number of parts.

In this background, an eight-speed automatic transmission has been introduced recently and a planetary gear train for an automatic transmission facilitating more shift-stages is under investigation.

An automatic transmission of eight or more shift-stages typically includes three to four planetary gear sets and five to six engagement elements (friction elements), and may easily become lengthy, deteriorating installability.

In this regard, disposing planetary gear sets in parallel or employing dog clutches instead of wet-type engagement elements is sometimes attempted. However, such an arrangement may not be widely applicable, and using dog clutches may easily deteriorate shift-feel.

In addition, a recent eight-speed automatic transmission typically shows a gear ratio span in a level of 6.5 to 7.5, which may require improvement for better fuel consumption.

Thus, shortening a length of an automatic transmission without deteriorating performance will be beneficial.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least nine forward speeds and one reverse speed, providing better performance and fuel efficiency of a vehicle.

An exemplary planetary gear train of an automatic transmission for a vehicle may include a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, an input shaft mounted with the first, second, and third planetary gear sets on an external circumference of the input shaft, and an output shaft disposed in parallel with the input shaft and mounted with the fourth planetary gear set on an external circumference of the output shaft. The exemplary planetary gear train may further include a first shaft fixedly connected to the first rotation element and the fourth rotation element, a second shaft fixedly connected to the second rotation element and the ninth rotation element, a third shaft fixedly connected to the third rotation element and the input shaft, a fourth shaft fixedly connected to the fifth rotation element, a fifth shaft fixedly connected to the sixth rotation element, a sixth shaft fixedly connected to the seventh rotation element, a seventh shaft fixedly connected to the eighth rotation element, an eighth shaft fixedly connected to the tenth rotation element and externally gear-meshed with the fifth shaft, a ninth shaft fixedly connected to the eleventh rotation element and the output shaft, a tenth shaft fixedly connected to the twelfth rotation element, and externally gear-meshed with the seventh shaft, and two transfer gears each forming external gear-engagement between a corresponding pair of shafts.

The sixth shaft may be selectively connectable to the first shaft and the fourth shaft, respectively. The fourth shaft and the fifth shaft may be selectively connectable to the transmission housing.

Two rotation elements among the first, second, and third rotation elements of the first planetary gear set may be selectively interconnected such that the first planetary gear set may integrally rotate. Two rotation elements among the tenth, eleventh, and twelfth rotation elements of the fourth planetary gear set may be selectively interconnected such that the fourth planetary gear set may integrally rotate.

The exemplary planetary gear train may further include a first clutch disposed between the first shaft and the third shaft, a second clutch disposed between the first shaft and the sixth shaft, a third clutch disposed between the fourth shaft and the sixth shaft, a fourth clutch disposed between the eighth shaft and the tenth shaft, a first brake disposed between the fifth shaft and the transmission housing, and a second brake disposed between the fourth shaft and the transmission housing.

The exemplary planetary gear train may further include a first clutch disposed between the first shaft and the second shaft, a second clutch disposed between the first shaft and the sixth shaft, a third clutch disposed between the fourth shaft and the sixth shaft, a fourth clutch disposed between the eighth shaft and the tenth shaft, a first brake disposed between the fifth shaft and the transmission housing, and a second brake disposed between the fourth shaft and the transmission housing.

The exemplary planetary gear train may further include a first clutch disposed between the second shaft and the third shaft, a second clutch disposed between the first shaft and the sixth shaft, a third clutch disposed between the fourth shaft and the sixth shaft, a fourth clutch disposed between the eighth shaft and the tenth shaft, a first brake disposed between the fifth shaft and the transmission housing, and a second brake disposed between the fourth shaft and the transmission housing.

The exemplary planetary gear train may further include a first clutch disposed between the first shaft and the third shaft, a second clutch disposed between the first shaft and the sixth shaft, a third clutch disposed between the fourth shaft and the sixth shaft, a fourth clutch disposed between the ninth shaft and the tenth shaft, a first brake disposed between the fifth shaft and the transmission housing, and a second brake disposed between the fourth shaft and the transmission housing.

The exemplary planetary gear train may further include a first clutch disposed between the first shaft and the third shaft, a second clutch disposed between the first shaft and the sixth shaft, a third clutch disposed between the fourth shaft and the sixth shaft, a fourth clutch disposed between the eighth shaft and the ninth shaft, a first brake disposed between the fifth shaft and the transmission housing, and a second brake disposed between the fourth shaft and the transmission housing.

The two transfer gears may include a first transfer gear disposed between the fifth shaft and the eighth shaft, and a second transfer gear disposed between the seventh shaft and the tenth shaft.

The first, second, and third rotation elements of the first planetary gear set may be a first sun gear, a first planet carrier, and first ring gear of the first planetary gear set. The fourth, fifth, and sixth rotation elements of the second planetary gear set may be a second sun gear, a second planet carrier, and a second ring gear of the second planetary gear set. The seventh, eighth, and ninth rotation elements of the third planetary gear set may be a third sun gear, a third planet carrier, and a third ring gear of the third planetary gear set. The tenth, eleventh, and twelfth rotation elements of the fourth planetary gear set may be a fourth sun gear, a fourth planet carrier, and a fourth ring gear of the fourth planetary gear set.

The first, second, and third planetary gear sets are disposed in the order of the first, second, and third planetary gear sets.

According to an exemplary planetary gear train, four planetary gear sets are dividedly on input shaft and output shaft that are in parallel, enhancing overall length and improving installability in a vehicle.

Furthermore, an exemplary planetary gear train employs two transfer gears in addition planetary gear sets, and thereby optimal gear ratios may be obtained for respective types of vehicles by altering the number of gear teeth of the transfer gears in a wide range. Furthermore, acceleration performance may be optimized by setting appropriate gear ratios.

Furthermore, a planetary gear train according to an exemplary embodiment of the present invention may achieve a gear ratio span of at least 9.28 while achieving at least nine forward speeds and one reverse speed, maximizing an engine driving efficiency.

Furthermore, multiple shift-stages are realized with high efficiency, and step ratios of shift-stages may become more linear, improving acceleration and engine drivability before and after a shifting.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective engagement elements at respective shift-stages in a planetary gear train according to various exemplary embodiments of the present invention.

Figure 1:
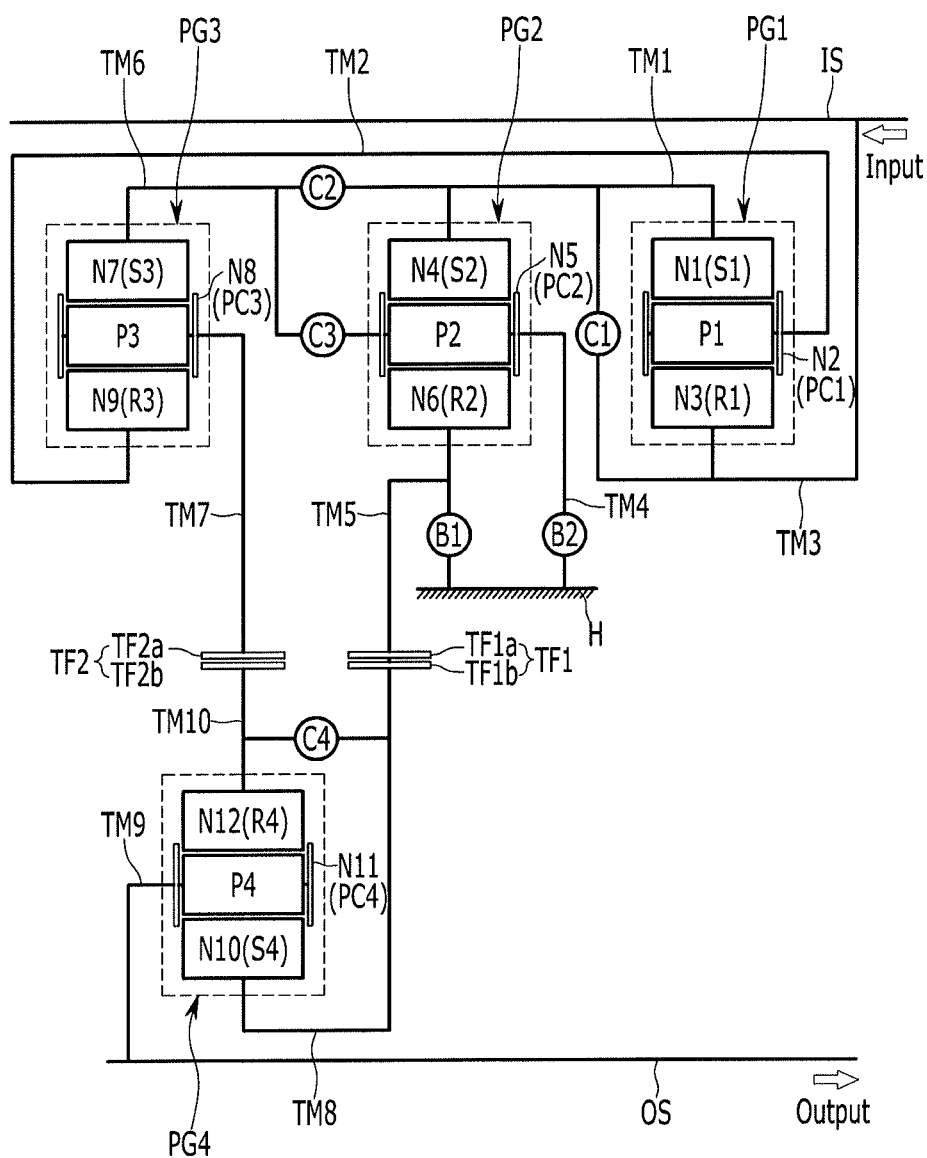
FIG. 1 is a schematic diagram of a planetary gear train according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will be hereinafter described in detail with reference to the accompanying drawings. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a planetary gear train according to various exemplary embodiments of the present invention.

Referring to FIG. 1, a planetary gear train according to various exemplary embodiments of the present invention includes an input shaft IS, an output shaft OS, first, second, third and fourth planetary gear sets PG1, PG2, PG3, and PG4, two transfer gears TF1 and TF2, and engagement elements of four clutches C1, C2, C3, and C4 and two brakes B1 and B2.

The input shaft IS is an input member and the torque from a crankshaft of an engine is input into the input shaft IS, after being torque-converted through a torque converter.

The output shaft OS is an output element, and, disposed in parallel with the input shaft IS, outputs a shifted driving torque to a driveshaft through a differential apparatus.

The first, second, and third planetary gear sets PG1, PG2, and PG3, forming a main shifting portion, are disposed on an external circumference of the input shaft IS, and are disposed in the order of the first, second, and third planetary gear sets PG1, PG2, and PG3 from an input side thereof.

The fourth planetary gear set PG4 is disposed on an external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as a tenth rotation element N10, the fourth planet carrier PC4 acts as an eleventh rotation element N11, and the fourth ring gear R4 acts as a twelfth rotation element N12.

In the arrangement of the first, second, and third planetary gear sets PG1, PG2, and PG3, the first rotation element N1 is fixedly connected to the fourth rotation element N4, the second rotation element N2 is fixedly connected to the ninth rotation element N9, forming seven shafts TM1 to TM7.

Regarding the fourth planetary gear set PG4, the rotation elements N10 to N12 of may act independently, forming three shafts TM8 to TM10.

The ten shafts TM1 to TM10 are hereinafter described in detail.

The first shaft TM1 is fixedly connected to the first rotation element N1 (first sun gear S1) and the fourth rotation element N4 (second sun gear S2).

The second shaft TM2 is fixedly connected to the second rotation element N2 (first planet carrier PC1) and the ninth rotation element N9.

The third shaft TM3 is fixedly connected to the third rotation element N3 (first ring gear R1), and fixedly connected to the input shaft IS thereby always acting as an input element, and selectively connectable to the first shaft TM1.

The fourth shaft TM4 is fixedly connected to the fifth rotation element N5 (second planet carrier PC2), and selectively connectable to the transmission housing H thereby selectively acting as a fixed element.

The fifth shaft TM5 is fixedly connected to the sixth rotation element N6 (second ring gear R2), and selectively connectable to the transmission housing H thereby selectively acting as a fixed element.

The sixth shaft TM6 is fixedly connected to the seventh rotation element N7 (third sun gear S3), and selectively connectable to the first shaft TM1 and the fourth shaft TM4, respectively.

The seventh shaft TM7 is fixedly connected to the eighth rotation element N8 (third ring gear R4).

The eighth shaft TM8 is fixedly connected to the tenth rotation element N10 (fourth sun gear S4), and externally gear-meshed with the fifth shaft TM5.

The ninth shaft TM9 is fixedly connected to the eleventh rotation element N11 (fourth planet carrier PC4), and fixedly connected to the output shaft OS, always acting as an output element.

The tenth shaft TM10 is fixedly connected to the twelfth rotation element N12 (fourth ring gear R4), externally gear-meshed with the seventh shaft TM7, and selectively connectable to the eighth shaft TM8.

The two transfer gears TF1 and TF2 delivers a shifted torque of the main shifting portion (first, second, and third planetary gear sets PG1, PG2, and PG3) to the auxiliary shifting portion (fourth planetary gear set PG4).

The first transfer gear TF1 includes a first transfer drive gear TF1*a* and a first transfer driven gear TF1*b* where the first transfer drive gear TF1*a* is connected to the fifth shaft TM5, and the first transfer driven gear TF1*b* is connected to the eighth shaft TM8, whereby the first transfer gear TF1 externally gear-meshes the fifth shaft TM5 and the eighth shaft TM8.

The second transfer gear TF2 includes a second transfer drive gear TF2*a* and a second transfer driven gear TF2*b*, where the second transfer drive gear TF2*a* is connected to the seventh shaft TM7, the second transfer driven gear TF2*b* is connected to the tenth shaft TM10, whereby the second transfer gear TF2 externally gear-meshes the seventh shaft TM7 and the tenth shaft TM10.

As a result, respective shafts connected by the first and second transfer gears TF1 and TF2 rotate in opposite directions, and the gear ratios of the first and second transfer gears TF1 and TF2 may be predetermined in consideration of required speed ratio of the transmission.

Each of the ten shafts TM1 to TM10 may be a rotation member that fixedly interconnects the input and output shafts and rotation elements of the planetary gear sets PG1, PG2, PG3, and PG4, or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

The engagement elements include the four clutches C1, C2, C3, and C4 and the two brakes B1 and B2, and are disposed as follows.

The first clutch C1 is disposed between the first shaft TM1 and the third shaft TM3, such that the first shaft TM1 and the third shaft TM3 may selectively become integral.

The second clutch C2 is disposed between the first shaft TM1 and the sixth shaft TM6, such that the first shaft TM1 and the sixth shaft TM6 may selectively become integral.

The third clutch C3 is disposed between the fourth shaft TM4 and the sixth shaft TM6, such that the fourth shaft TM4 and the sixth shaft TM6 may be selectively interconnected.

The fourth clutch C4 is disposed between the eighth shaft TM8 and the tenth shaft TM10, such that the eighth shaft TM8 and the tenth shaft TM10 may be selectively interconnected.

The first brake B1 is disposed between the fifth shaft TM5 and the transmission housing H, such that the fifth shaft TM5 may selectively act as a fixed element.

The second brake B2 is disposed between the fourth shaft TM4 and the transmission housing H, such that the fourth shaft TM4 may selectively act as a fixed element.

In the various exemplary embodiments of the present invention, the first clutch C1 selectively connects the first shaft TM1 and the third shaft TM3. It is notable that the first clutch C1 enables the first planetary gear set PG1 to integrally rotate by selectively connecting two rotation elements among the first, second, and third rotation elements N1, N2, and N3 of the first planetary gear set PG1. In the present background, it may be understood that the first clutch C1 may be varied to selectively connect two shafts among the first shaft TM1, the second shaft TM2, and the third shaft TM3, which results the same function of selectively forcing the first planetary gear set PG1 to integrally rotate. These variations will be later explained as second and various exemplary embodiments with reference to FIG. 3 and FIG. 4.

In the various exemplary embodiments of the present invention, the fourth clutch C4 selectively connects the eighth shaft TM8 and the tenth shaft TM10. It is notable that the fourth clutch C4 enables the fourth planetary gear set PG4 to integrally rotate by selectively connecting two rotation elements among the tenth, eleventh, and twelfth rotation elements N10, N11, and N12 of the fourth planetary gear set PG4. In the present background, it may be understood that the fourth clutch C4 may be varied to selectively connect two shafts among the eighth shaft TM8, the ninth shaft TM9, and the tenth shaft TM10, which results the same function of selectively forcing the fourth planetary gear set PG4 to integrally rotate. These variations will be later explained as fourth and various exemplary embodiments with reference to FIG. 5 and FIG. 6.

The engagement elements of the first, second, third and fourth clutches C1, C2, C3, and C4 and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

FIG. 2 is an operational chart for respective engagement elements at respective shift-stages in a planetary gear train according to various exemplary embodiments of the present invention.

Referring to FIG. 2, a planetary gear train according to various exemplary embodiments realizes shifting by operating three elements among the engagement elements of the first, second, third and fourth clutches C1, C2, C3, and C4 and the first and second brakes B1 and B2.

[The First Forward Speed]

In the first forward speed D1, the second and fourth clutches C2 and C4 and the second brake B2 are simultaneously operated.

As a result, the first shaft TM1 is connected to the sixth shaft TM6 by the operation of the second clutch C2, and the eighth shaft TM8 is connected to the tenth shaft TM10 by the operation of the fourth clutch C4. In the present state, torque of the input shaft IS is input to the third shaft TM3, and the fourth shaft TM4 acts as a fixed element by the operation of the second brake B2, realizing the first forward speed by cooperative operation of respective shafts and outputting a shifted torque to the output shaft OS connected to the ninth shaft TM9.

[The Second Forward Speed]

In the second forward speed D2, the third and fourth clutches C3 and C4 and the second brake B2 are simultaneously operated.

As a result, the fourth shaft TM4 is connected to the sixth shaft TM6 by the operation of the third clutch C3, and the eighth shaft TM8 is connected to the tenth shaft TM10 by the operation of the fourth clutch C4. In the present state, torque of the input shaft IS is input to the third shaft TM3, and the fourth shaft TM4 acts as a fixed element by the operation of the second brake B2, realizing the second forward speed by cooperative operation of respective shafts and outputting a shifted torque to the output shaft OS connected to the ninth shaft TM9.

[The Third Forward Speed]

In the third forward speed D3, the third clutch C3 and the first and second brakes B1 and B2 are simultaneously operated.

As a result, the fourth shaft TM4 is connected to the sixth shaft TM6 by the operation of the third clutch C3, torque of the input shaft IS is input to the third shaft TM3, and the fifth shaft TM5 and the fourth shaft TM4 act as a fixed element by the operation of the first and second brakes B1 and B2, realizing the third forward speed by cooperative operation of respective shafts and outputting a shifted torque to the output shaft OS connected to the ninth shaft TM9.

[The Fourth Forward Speed]

In the fourth forward speed D4, the first and third clutches C1 and C3 and the second brake B2 are simultaneously operated.

As a result, the first shaft TM1 is connected to the third shaft TM3 by the operation of the first clutch C1, and the fourth shaft TM4 is connected to the sixth shaft TM6 by the operation of the third clutch C3. In the present state, torque of the input shaft IS is input to the third shaft TM3, and the fourth shaft TM4 acts as a fixed element by the operation of the second brake B2, realizing the fourth forward speed by cooperative operation of respective shafts and outputting a shifted torque to the output shaft OS connected to the ninth shaft TM9.

[The Fifth Forward Speed]

In the fifth forward speed D5, the first and third clutches C1 and C3 and the first brake B1 are simultaneously operated.

As a result, the first shaft TM1 is connected to the third shaft TM3 by the operation of the first clutch C1, and the fourth shaft TM4 is connected to the sixth shaft TM6 by the operation of the third clutch C3. In the present state, torque of the input shaft IS is input to the third shaft TM3, and the fifth shaft TM5 acts as a fixed element by the operation of the first brake B1, realizing the fifth forward speed by cooperative operation of respective shafts and outputting a shifted torque to the output shaft OS connected to the ninth shaft TM9.

[The Sixth Forward Speed]

In the sixth forward speed D6, the first and second clutch C1 and C2 and the first brake B1 are simultaneously operated.

As a result, the first shaft TM1 is connected to the third shaft TM3 by the operation of the first clutch C1, and the first shaft TM1 is connected to the sixth shaft TM6 by the operation of the second clutch C2. In the present state, torque of the input shaft IS is input to the third shaft TM3, and the fifth shaft TM5 acts as a fixed element by the operation of the first brake B1, realizing the sixth forward speed by cooperative operation of respective shafts and outputting a shifted torque to the output shaft OS connected to the ninth shaft TM9.

[The Seventh Forward Speed]

In the seventh forward speed D7, the first, second, and third clutches C1, C2, and C3 are simultaneously operated.

As a result, the first shaft TM1 is connected to the third shaft TM3 by the operation of the first clutch C1, the first shaft TM1 is connected to the sixth shaft TM6 by the operation of the second clutch C2, and the fourth shaft TM4 is connected to the sixth shaft TM6 by the operation of the third clutch C3. In the present state, torque of the input shaft IS is input to the third shaft TM3, realizing the seventh forward speed by cooperative operation of respective shafts and outputting a shifted torque to the output shaft OS connected to the ninth shaft TM9.

[The Eighth Forward Speed]

In the eighth forward speed D8, the first, second, and fourth clutches C1, C2, and C4 are simultaneously operated.

As a result, the first shaft TM1 is connected to the third shaft TM3 by the operation of the first clutch C1, the first shaft TM1 is connected to the sixth shaft TM6 by the operation of the second clutch C2, and the eighth shaft TM8 is connected to the tenth shaft TM10 by the operation of the fourth clutch C4. In the present state, torque of the input shaft IS is input to the third shaft TM3, realizing the eighth forward speed by cooperative operation of respective shafts and outputting a shifted torque to the output shaft OS connected to the ninth shaft TM9.

[The Ninth Forward Speed]

In the ninth forward speed D9, the first, third, and fourth clutches C1, C3, and C4 are simultaneously operated.

As a result, the first shaft TM1 is connected to the third shaft TM3 by the operation of the first clutch C1, the fourth shaft TM4 is connected to the sixth shaft TM6 by the operation of the third clutch C3, and the eighth shaft TM8 is connected to the tenth shaft TM10 by the operation of the fourth clutch C4. In the present state, torque of the input shaft IS is input to the third shaft TM3, realizing the ninth forward speed by cooperative operation of respective shafts and outputting a shifted torque to the output shaft OS connected to the ninth shaft TM9.

[The Reverse Speed]

In the reverse speed REV, the first, fourth clutch C1 and C4 and the second brake B2 are simultaneously operated.

As a result, the first shaft TM1 is connected to the third shaft TM3 by the operation of the first clutch C1, and the eighth shaft TM8 is connected to the tenth shaft TM10 by the operation of the fourth clutch C4. In the present state, torque of the input shaft IS is input to the third shaft TM3, and the fourth shaft TM4 acts as a fixed element by the operation of the second brake B2, realizing the reverse speed by cooperative operation of respective shafts and outputting a shifted torque to the output shaft OS connected to the ninth shaft TM9.

FIG. 2 shows gear ratios determined under the condition that the gear ratio of the first ring gear R1/the first sun gear S1 is 1.85, the gear ratio of the second ring gear R2/the second sun gear S2 is 2.71, the gear ratio of the third ring gear R3/the third sun gear S3 is 2.72, the gear ratio of the fourth ring gear R4/the fourth sun gear S4 is 1.88, the gear ratio of the first transfer driven gear TF1$b$/the first transfer drive gear TF1$a$ is 1.21, and the gear ratio of the second transfer driven gear TF2$b$/the second transfer drive gear TF2$a$ is 0.67. However, the present invention is not limited to specific figures, since the figures may be changed under the spirit of the present invention.

Figure 3:
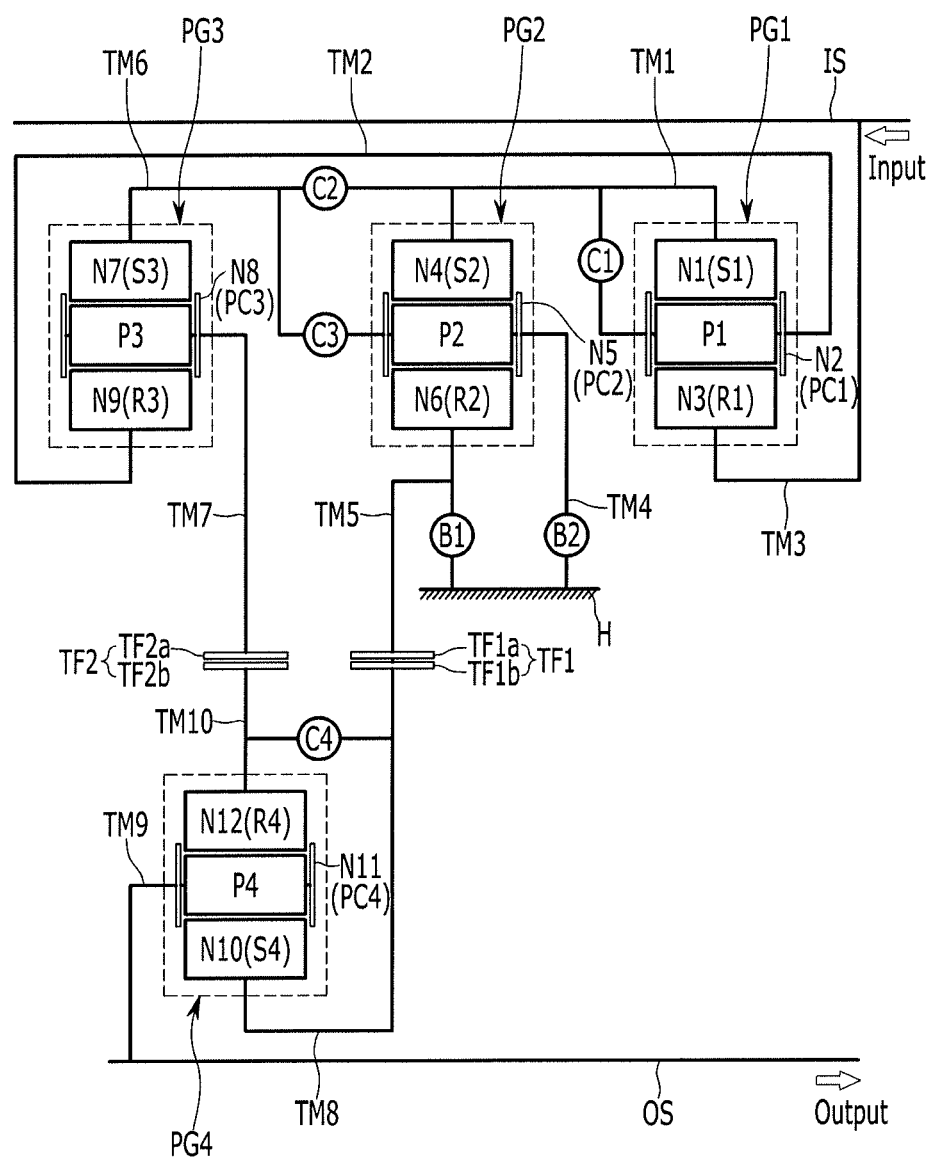
FIG. 3 is a schematic diagram of a planetary gear train according to various exemplary embodiments of the present invention.

FIG. 3 is a schematic diagram of a planetary gear train according to various exemplary embodiments of the present invention.

In a planetary gear train according to various exemplary embodiments shown in FIG. 1, the first clutch C1 to integrally rotate the first planetary gear set PG1 is disposed between the first shaft TM1 and the third shaft TM3. In a planetary gear train according to various exemplary embodiments shown in FIG. 3, the first clutch C1 is disposed between the first shaft TM1 and the second shaft TM2.

Although the planetary gear train according to various exemplary embodiments differs from a planetary gear train according to various exemplary embodiments only in the location of the first clutch C1, and operations and functions of the planetary gear train remain the same.

Figure 4:
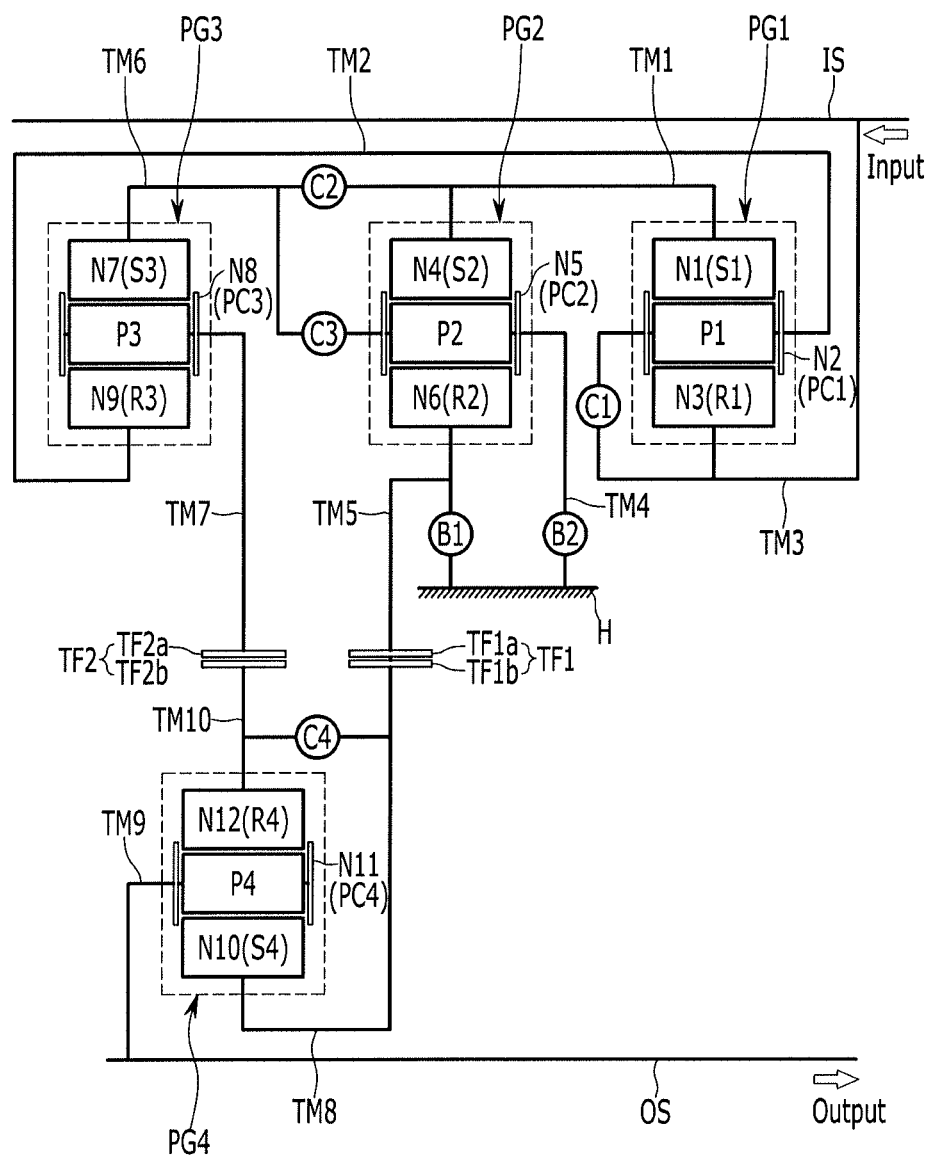
FIG. 4 is a schematic diagram of a planetary gear train according to various exemplary embodiments of the present invention.

FIG. 4 is a schematic diagram of a planetary gear train according to various exemplary embodiments of the present invention.

In a planetary gear train according to various exemplary embodiments shown in FIG. 4, the first clutch C1 to integrally rotate the first planetary gear set PG1 is disposed between the first shaft TM1 and the third shaft TM3. In a planetary gear train according to various exemplary embodiments shown in FIG. 4, the first clutch C1 is disposed between the second shaft TM2 and the third shaft TM3.

Although the planetary gear train according to various exemplary embodiments differs from a planetary gear train according to various exemplary embodiments only in the location of the first clutch C1, and operations and functions of the planetary gear train remain the same.

Figure 5:
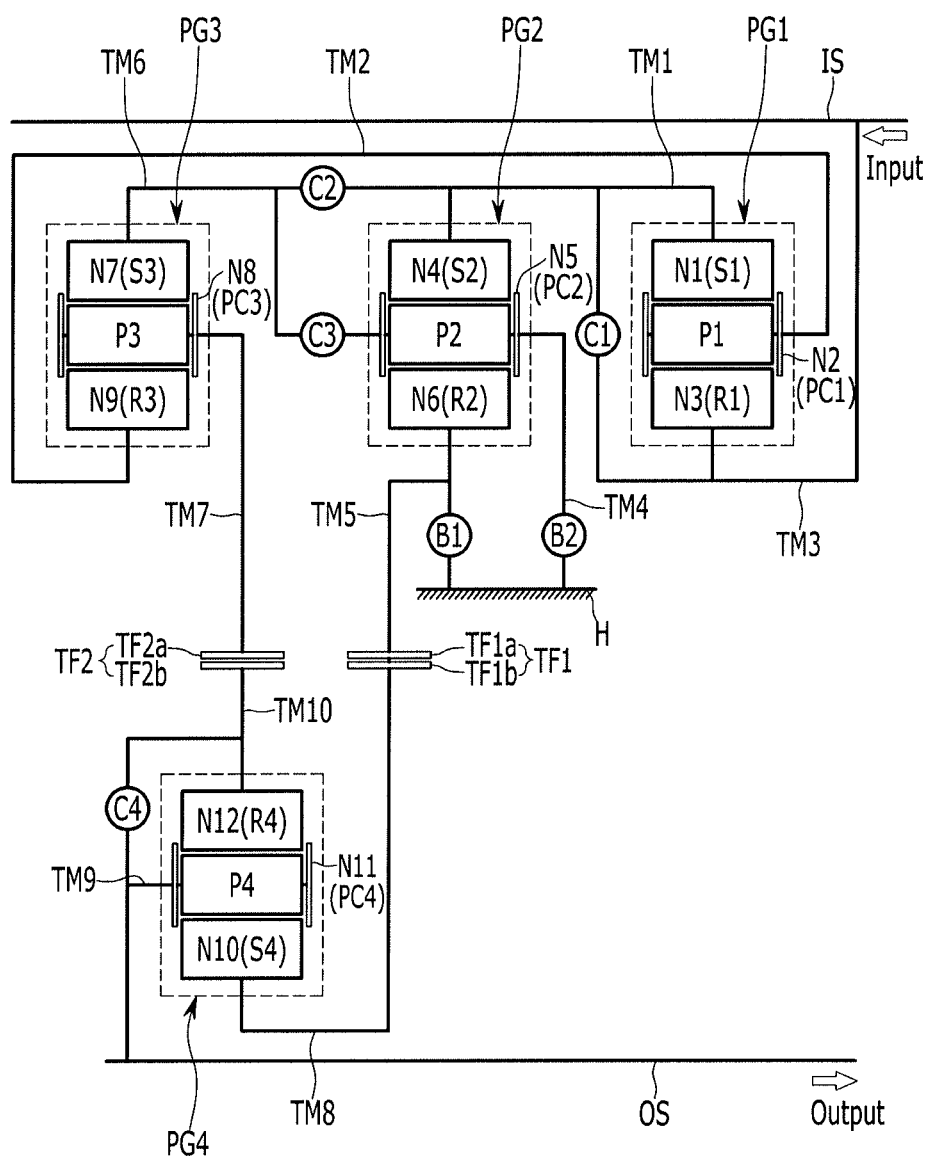
FIG. 5 is a schematic diagram of a planetary gear train according to various exemplary embodiments of the present invention.

FIG. 5 is a schematic diagram of a planetary gear train according to various exemplary embodiments of the present invention.

In a planetary gear train according to various exemplary embodiments shown in FIG. 1, the fourth clutch C4 to integrally rotate the fourth planetary gear set PG4 is disposed between the eighth shaft TM8 and the tenth shaft TM10. In a planetary gear train according to various exemplary embodiments shown in FIG. 5, the fourth clutch C4 is disposed between the ninth shaft TM9 and the tenth shaft TM10.

Although the planetary gear train according to various exemplary embodiments differs from a planetary gear train according to various exemplary embodiments only in the location of the fourth clutch C4, and operations and functions of the planetary gear train remain the same.

Figure 6:
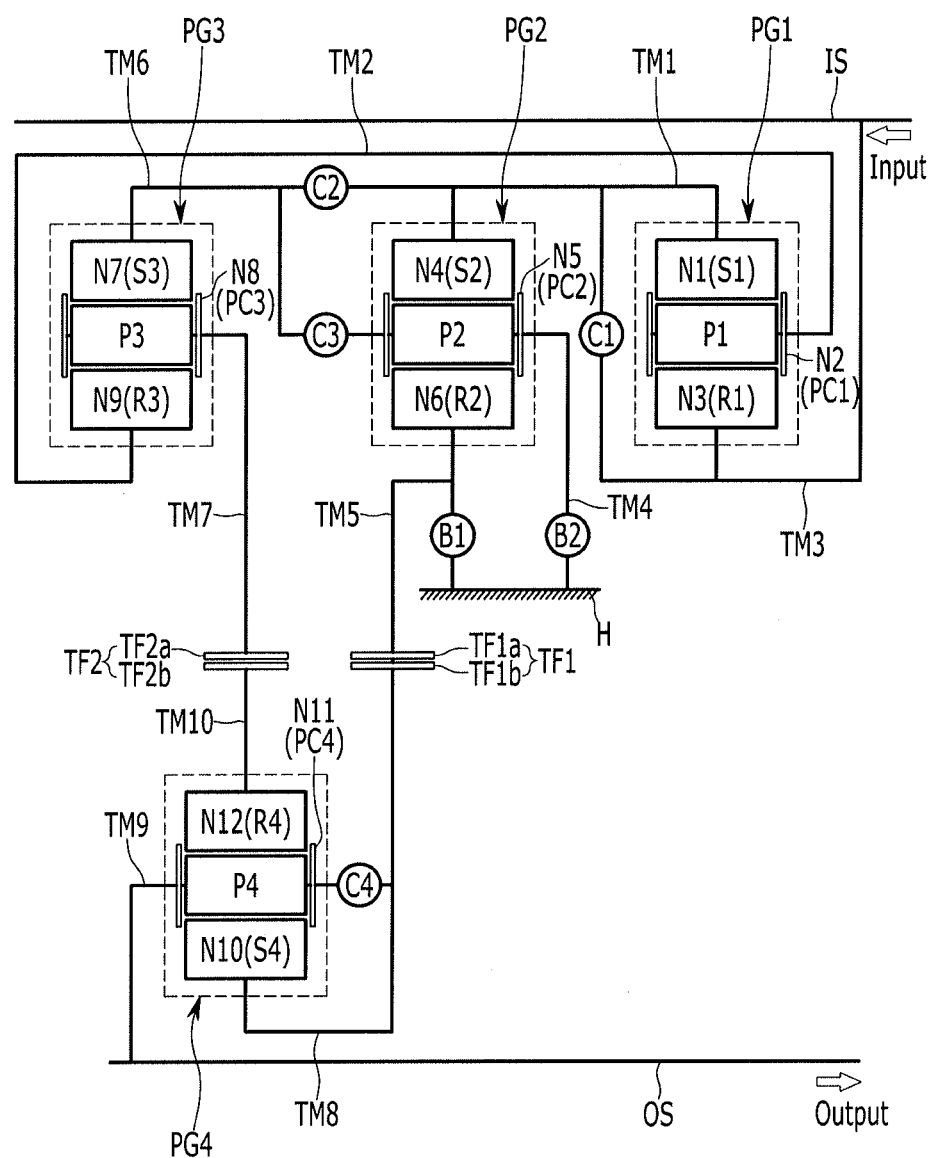
FIG. 6 is a schematic diagram of a planetary gear train according to various exemplary embodiments of the present invention.

FIG. 6 is a schematic diagram of a planetary gear train according to various exemplary embodiments of the present invention.

In a planetary gear train according to various exemplary embodiments shown in FIG. 1, the fourth clutch C4 to integrally rotate the fourth planetary gear set PG4 is disposed between the eighth shaft TM8 and the tenth shaft TM10. In a planetary gear train according to various exemplary embodiments shown in FIG. 6, the fourth clutch C4 is disposed between the eighth shaft TM8 and the ninth shaft TM9.

Although the planetary gear train according to various exemplary embodiments differs from a planetary gear train according to various exemplary embodiments only in the location of the fourth clutch C4, and operations and functions of the planetary gear train remain the same.

As described above, a planetary gear train according to an exemplary embodiment of the present invention realizes nine forward speeds and one reverse speed by combination of four planetary gear sets PG1, PG2, PG3, and PG4 disposed on input and output shafts disposed in parallel, two transfer gears TF1 and TF2, and engagement elements of four clutches C1, C2, C3, and C4 and two brakes B1 and B2. By such an arrangement, fuel consumption may be improved by improving power delivery performance, and installability may be improved by reducing a length.

Furthermore, an exemplary planetary gear train employs two transfer gears in addition planetary gear sets, and thereby optimal gear ratios may be obtained for respective types of vehicles by altering the number of gear teeth of the transfer gears in a wide range. Furthermore, acceleration performance may be optimized by setting appropriate gear ratios.

Furthermore, a planetary gear train according to an exemplary embodiment of the present invention may achieve a gear ratio span of at least 9.28 while achieving at least nine forward speeds and one reverse speed, maximizing an engine driving efficiency.

Furthermore, multiple shift-stages are realized with high efficiency, and step ratios of shift-stages may become more linear, improving acceleration and engine drivability before and after a shifting.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the apparatus comprising:
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   an input shaft mounted with the first, second, and third planetary gear sets along an external circumference of the input shaft;
   an output shaft disposed in parallel with the input shaft and mounted with the fourth planetary gear set along an external circumference of the output shaft;
   a first shaft fixedly connected to the first rotation element and the fourth rotation element;
   a second shaft fixedly connected to the second rotation element and the ninth rotation element;
   a third shaft fixedly connected to the third rotation element and the input shaft;
   a fourth shaft fixedly connected to the fifth rotation element;
   a fifth shaft fixedly connected to the sixth rotation element;
   a sixth shaft fixedly connected to the seventh rotation element;
   a seventh shaft fixedly connected to the eighth rotation element;
   an eighth shaft fixedly connected to the tenth rotation element and externally gear-engaged with the fifth shaft;
   a ninth shaft fixedly connected to the eleventh rotation element and the output shaft;
   a tenth shaft fixedly connected to the twelfth rotation element, and externally gear-engaged with the seventh shaft; and
   two transfer gears each forming external gear-engagement between a corresponding pair among the first to tenth shafts.

2. The planetary gear train apparatus of claim 1, wherein the sixth shaft is selectively connectable to the first shaft or the fourth shaft, respectively; and
   each of the fourth shaft and the fifth shaft is selectively connectable to a transmission housing.

3. The planetary gear train apparatus of claim 2, wherein two rotation elements among the first rotation element, the second rotation element, and the third rotation element of the first planetary gear set are selectively interconnected such that the first planetary gear set integrally rotates;

two rotation elements among the tenth rotation element, the eleventh rotation element, and the twelfth rotation element of the fourth planetary gear set are selectively interconnected such that the fourth planetary gear set integrally rotates.

4. The planetary gear train apparatus of claim 3, further including:
   a first clutch mounted between the first shaft and the third shaft;
   a second clutch mounted between the first shaft and the sixth shaft;
   a third clutch mounted between the fourth shaft and the sixth shaft;
   a fourth clutch mounted between the eighth shaft and the tenth shaft;
   a first brake mounted between the fifth shaft and the transmission housing; and
   a second brake mounted between the fourth shaft and the transmission housing.

5. The planetary gear train apparatus of claim 3, further including:
   a first clutch mounted between the first shaft and the second shaft;
   a second clutch mounted between the first shaft and the sixth shaft;
   a third clutch mounted between the fourth shaft and the sixth shaft;
   a fourth clutch mounted between the eighth shaft and the tenth shaft;
   a first brake mounted between the fifth shaft and the transmission housing; and
   a second brake mounted between the fourth shaft and the transmission housing.

6. The planetary gear train apparatus of claim 3, further including:
   a first clutch mounted between the second shaft and the third shaft;
   a second clutch mounted between the first shaft and the sixth shaft;
   a third clutch mounted between the fourth shaft and the sixth shaft;
   a fourth clutch mounted between the eighth shaft and the tenth shaft;
   a first brake mounted between the fifth shaft and the transmission housing; and
   a second brake mounted between the fourth shaft and the transmission housing.

7. The planetary gear train apparatus of claim 3, further including:
   a first clutch mounted between the first shaft and the third shaft;
   a second clutch mounted between the first shaft and the sixth shaft;
   a third clutch mounted between the fourth shaft and the sixth shaft;
   a fourth clutch mounted between the ninth shaft and the tenth shaft;
   a first brake mounted between the fifth shaft and the transmission housing; and
   a second brake mounted between the fourth shaft and the transmission housing.

8. The planetary gear train apparatus of claim 3, further including:
   a first clutch mounted between the first shaft and the third shaft;
   a second clutch mounted between the first shaft and the sixth shaft;
   a third clutch mounted between the fourth shaft and the sixth shaft;
   a fourth clutch mounted between the eighth shaft and the ninth shaft;
   a first brake mounted between the fifth shaft and the transmission housing; and
   a second brake mounted between the fourth shaft and the transmission housing.

9. The planetary gear train apparatus of claim 3, wherein the two transfer gears comprise:
   a first transfer gear disposed between the fifth shaft and the eighth shaft; and
   a second transfer gear disposed between the seventh shaft and the tenth shaft.

10. The planetary gear train apparatus of claim 1, wherein
   the first rotation element, the second rotation element, and the third rotation element of the first planetary gear set are a first sun gear, a first planet carrier, and first ring gear of the first planetary gear set;
   the fourth rotation element, the fifth rotation element, and the sixth rotation element of the second planetary gear set are a second sun gear, a second planet carrier, and a second ring gear of the second planetary gear set;
   the seventh rotation element, the eighth rotation element, and the ninth rotation element of the third planetary gear set are a third sun gear, a third planet carrier, and a third ring gear of the third planetary gear set; and
   the tenth rotation element, the eleventh rotation element, and the twelfth rotation element of the fourth planetary gear set are a fourth sun gear, a fourth planet carrier, and a fourth ring gear of the fourth planetary gear set.

11. The planetary gear train apparatus of claim 1, wherein the first, second, and third planetary gear sets are disposed in an order of the first, second, and third planetary gear sets along the input shaft.

12. A planetary gear train apparatus of an automatic transmission for a vehicle, the apparatus comprising:
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   an input shaft mounted with the first, second, and third planetary gear sets along an external circumference of the input shaft; and
   an output shaft disposed in parallel with the input shaft and mounted with the fourth planetary gear set along an external circumference of the output shaft,
   wherein the first rotation element is fixedly connected to the fourth rotation element,
   the second rotation element is fixedly connected to the ninth rotation element,
   the third rotation element is fixedly connected to the input shaft,
   the sixth rotation element is externally gear-engaged with the tenth rotation element,
   the seventh rotation element is selectively connectable to the fourth rotation element or the fifth rotation element, respectively,
   the eighth rotation element is externally gear-engaged with the twelfth rotation element, and the eleventh rotation element is fixedly connected to the output shaft.

13. The planetary gear train apparatus of claim 12, wherein
the fifth rotation element is selectively connectable to a transmission housing;
the sixth rotation element is selectively connectable to the transmission housing;
a first transfer gear is disposed between the sixth rotation element and the tenth rotation element; and
a second transfer gear is disposed between the eighth rotation element and the twelfth rotation element.

14. The planetary gear train apparatus of claim 13, wherein
two rotation elements among the first rotation element, the second rotation element, and the third rotation element of the first planetary gear set are selectively interconnected such that the first planetary gear set integrally rotates;
two rotation elements among the tenth rotation element, the eleventh rotation element, and the twelfth rotation element of the fourth planetary gear set are selectively interconnected such that the fourth planetary gear set integrally rotates.

15. The planetary gear train apparatus of claim 14, further including:
a first clutch selectively connecting the first rotation element and the third rotation element;
a second clutch selectively connecting the fourth rotation element and the seventh rotation element;
a third clutch selectively connecting the fifth rotation element and the seventh rotation element;
a fourth clutch selectively connecting the tenth rotation element and the twelfth rotation element;
a first brake selectively connecting the sixth rotation element and the transmission housing; and
a second brake selectively connecting the fifth rotation element and the transmission housing.

16. The planetary gear train apparatus of claim 14, further including:
a first clutch selectively connecting the first rotation element and the second rotation element;
a second clutch selectively connecting the fourth rotation element and the seventh rotation element;
a third clutch selectively connecting the fifth rotation element and the seventh rotation element;
a fourth clutch selectively connecting the tenth rotation element and the twelfth rotation element;
a first brake selectively connecting the sixth rotation element and the transmission housing; and
a second brake selectively connecting the fifth rotation element and the transmission housing.

17. The planetary gear train apparatus of claim 14, further including:
a first clutch selectively connecting the second rotation element and the third rotation element;
a second clutch selectively connecting the fourth rotation element and the seventh rotation element;
a third clutch selectively connecting the fifth rotation element and the seventh rotation element;
a fourth clutch selectively connecting the tenth rotation element and the twelfth rotation element;
a first brake selectively connecting the sixth rotation element and the transmission housing; and
a second brake selectively connecting the fifth rotation element and the transmission housing.

18. The planetary gear train apparatus of claim 14, further including:
a first clutch selectively connecting the first rotation element and the third rotation element;
a second clutch selectively connecting the fourth rotation element and the seventh rotation element;
a third clutch selectively connecting the fifth rotation element and the seventh rotation element;
a fourth clutch selectively connecting the eleventh rotation element and the twelfth rotation element;
a first brake selectively connecting the sixth rotation element and the transmission housing; and
a second brake selectively connecting the fifth rotation element and the transmission housing.

19. The planetary gear train apparatus of claim 14, further including:
a first clutch selectively connecting the first rotation element and the third rotation element;
a second clutch selectively connecting the fourth rotation element and the seventh rotation element;
a third clutch selectively connecting the fifth rotation element and the seventh rotation element;
a fourth clutch selectively connecting the tenth rotation element and the eleventh rotation element;
a first brake selectively connecting the sixth rotation element and the transmission housing; and
a second brake selectively connecting the fifth rotation element and the transmission housing.

20. The planetary gear train apparatus of claim 12, wherein
the first rotation element, the second rotation element, and the third rotation element of the first planetary gear set are a first sun gear, a first planet carrier, and first ring gear of the first planetary gear set;
the fourth rotation element, the fifth rotation element, and the sixth rotation element of the second planetary gear set are a second sun gear, a second planet carrier, and a second ring gear of the second planetary gear set; and
the seventh rotation element, the eighth rotation element, and the ninth rotation element of the third planetary gear set are a third sun gear, a third planet carrier, and a third ring gear of the third planetary gear set;
the tenth rotation element, the eleventh rotation element, and the twelfth rotation element of the fourth planetary gear set are a fourth sun gear, a fourth planet carrier, and a fourth ring gear of the fourth planetary gear set.

21. The planetary gear train apparatus of claim 12, wherein first, second, and third planetary gear sets are disposed in an order of the first, second, and third planetary gear sets along the input shaft.

* * * * *